(12) United States Patent
Hui et al.

(10) Patent No.: US 9,686,907 B2
(45) Date of Patent: Jun. 27, 2017

(54) ROTARY FLOW DIVIDER ASSEMBLY FOR AGRICULTURAL PRODUCT DISTRIBUTION SYSTEM

(71) Applicant: CNH Industrial Canada, Ltd., Saskatoon (CA)

(72) Inventors: Ka Po Catherine Hui, Saskatoon (CA); Darwin L. Zacharias, Saskatoon (CA); Dennis G. Thompson, Saskatoon (CA); Dennis W. Chahley, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 14/364,384

(22) PCT Filed: Jan. 18, 2013

(86) PCT No.: PCT/IB2013/050158
§ 371 (c)(1),
(2) Date: Jun. 11, 2014

(87) PCT Pub. No.: WO2013/105021
PCT Pub. Date: Jul. 18, 2013

(65) Prior Publication Data
US 2014/0311598 A1    Oct. 23, 2014

Related U.S. Application Data

(60) Provisional application No. 61/584,694, filed on Jan. 9, 2012.

(51) Int. Cl.
*A01C 7/20* (2006.01)
*B65G 53/56* (2006.01)
(Continued)

(52) U.S. Cl.
CPC ............. *A01C 7/20* (2013.01); *A01C 7/084* (2013.01); *A01C 7/088* (2013.01); *B65G 53/56* (2013.01);
(Continued)

(58) Field of Classification Search
CPC ....... A01C 7/20; A01C 7/084; F16K 37/0008; F16K 11/0853; F16K 11/0833;
(Continued)

(56) References Cited

U.S. PATENT DOCUMENTS 154,477 A    8/1874    Hambitzer
1,116,270 A    11/1914    Harper
(Continued)

FOREIGN PATENT DOCUMENTS

CA    2555683    6/1999
CA    2555683 A1    8/1999
(Continued)

OTHER PUBLICATIONS

PCT International Search Report and Written Opinion for PCT Application No. PCT/IB2013/050158 dated May 22, 2013, 8 pages.
(Continued)

*Primary Examiner* — Michael R Reid
(74) *Attorney, Agent, or Firm* — Rebecca L. Henkel; Rickard K. DeMille

(57) ABSTRACT

A rotary flow divider assembly is provided that includes a housing having an inlet passage configured to receive agricultural product, a first outlet passage configured to discharge the agricultural product, and a second outlet passage configured to discharge the agricultural product. The rotary flow divider assembly also includes a rotary valve selectively rotatable between a first position that facilitates flow of the agricultural product from the inlet passage to the first and second outlet passages, a second position that facilitates
(Continued)

flow of the agricultural product from the inlet passage to the first outlet passage, and substantially blocks flow of the agricultural product from the inlet passage to the second outlet passage, and a third position that facilitates flow of the agricultural product from the inlet passage to the second outlet passage, and substantially blocks flow of the agricultural product from the inlet passage to the first outlet passage.

14 Claims, 7 Drawing Sheets

(51) Int. Cl.
 F16K 11/085 (2006.01)
 A01C 7/08 (2006.01)
 F16K 37/00 (2006.01)

(52) U.S. Cl.
 CPC ...... *F16K 11/0853* (2013.01); *F16K 37/0008* (2013.01); *B65G 2201/0202* (2013.01); *Y10T 137/8309* (2015.04); *Y10T 137/86871* (2015.04)

(58) Field of Classification Search
 CPC .......... F16K 27/065; B65G 53/56; B65G 2201/0202; Y10T 137/8309; Y10T 137/86823; Y10T 137/86863; Y10T 137/86871; Y10T 137/86831
 USPC ............ 137/625.42, 625.46, 625.47, 625.41, 137/556.6
 See application file for complete search history.

(56) References Cited

U.S. PATENT DOCUMENTS

| | | | |
|---|---|---|---|
| 1,166,571 A | 1/1916 | Bard | |
| 2,673,126 A | 3/1954 | Matthews | |
| 2,719,681 A | 10/1955 | Haberkorn et al. | |
| 2,743,742 A | 5/1956 | Muff | |
| 3,165,124 A | 1/1965 | Ausburn et al. | |
| RE26,238 E | 7/1967 | Snell, Jr. | |
| 3,631,825 A | 1/1972 | Weiste | |
| 3,721,265 A | 3/1973 | Hoffland | |
| 3,774,863 A | 11/1973 | Ekama | |
| 4,522,291 A | 6/1985 | Smick | |
| 4,635,674 A * | 1/1987 | Bajka | E04H 4/1209 137/625.46 |
| 4,738,774 A | 4/1988 | Patrick | |
| 4,982,760 A | 1/1991 | Mustaklem | |
| 5,072,758 A | 12/1991 | Krambrock | |
| 5,074,228 A | 12/1991 | Daws | |
| 5,183,762 A | 2/1993 | Meiattini | |
| 5,215,547 A | 6/1993 | Bostick et al. | |
| 5,265,547 A | 11/1993 | Daws | |
| 5,878,679 A | 3/1999 | Gregor et al. | |
| 5,927,217 A | 7/1999 | Halford et al. | |
| 6,182,699 B1 | 2/2001 | Hawkes | |
| 6,192,813 B1 | 2/2001 | Memory et al. | |
| 6,227,770 B1 | 5/2001 | Poncelet et al. | |
| 6,273,648 B1 | 8/2001 | Poncelet et al. | |
| 6,298,797 B1 | 10/2001 | Mayerle et al. | |
| 6,497,250 B1 | 12/2002 | Johann | |
| 6,622,747 B2 | 9/2003 | Sato et al. | |
| 6,655,413 B2 | 12/2003 | Condon et al. | |
| 6,883,445 B2 | 4/2005 | Mayerle | |
| 6,928,939 B1 | 8/2005 | Johnson et al. | |
| 7,213,617 B2 | 5/2007 | Snipes et al. | |
| 7,395,769 B2 | 7/2008 | Jensen | |
| 7,647,875 B2 | 1/2010 | Landphair et al. | |
| 7,849,877 B2 * | 12/2010 | Tan | F16K 11/0853 137/625.46 |
| 7,886,769 B2 | 2/2011 | Müller | |
| 8,001,914 B2 | 8/2011 | Peterson et al. | |
| 2001/0014258 A1* | 8/2001 | Poncelet | A01C 7/082 406/195 |
| 2007/0068584 A1* | 3/2007 | Murdock | F16K 5/0605 137/625.47 |
| 2008/0295751 A1 | 12/2008 | Shoup et al. | |
| 2010/0313801 A1 | 12/2010 | Peterson et al. | |

FOREIGN PATENT DOCUMENTS

| | | |
|---|---|---|
| FR | 1329057 | 6/1963 |
| JP | 2007064461 | 3/2007 |
| WO | 2009110845 | 9/2009 |

OTHER PUBLICATIONS

PCT Preliminary Report on Patentability for PCT Application No. PCT/IB2013/050158 dated Jul. 24, 2014, 6 pages.
Carolina Conveying, Inc. "Plug Diverters", Canton, NC, 2011, 4 pages. http://www.carolinaconveying.com/CC_Plug_Diverter.pdf.
Russian Office Action dated Oct. 12, 2015.

* cited by examiner

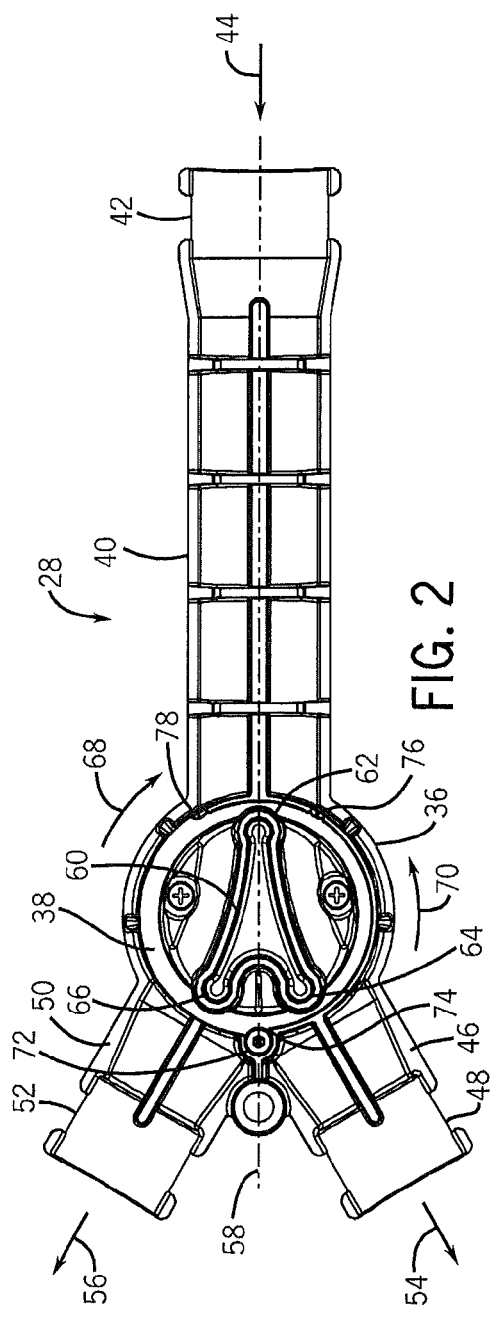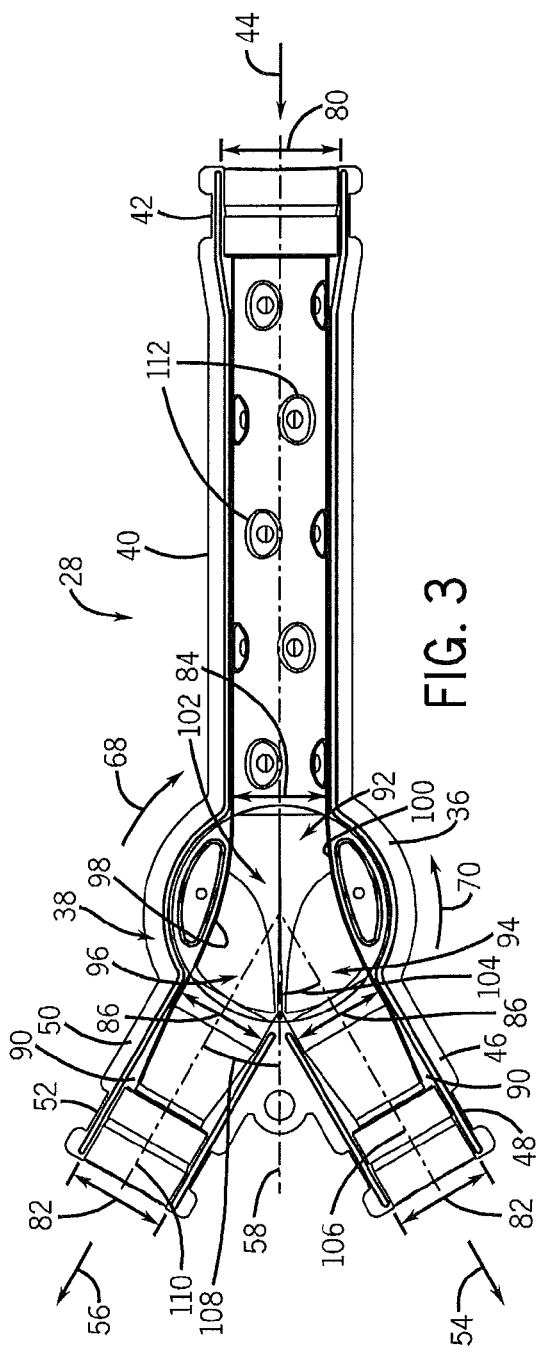

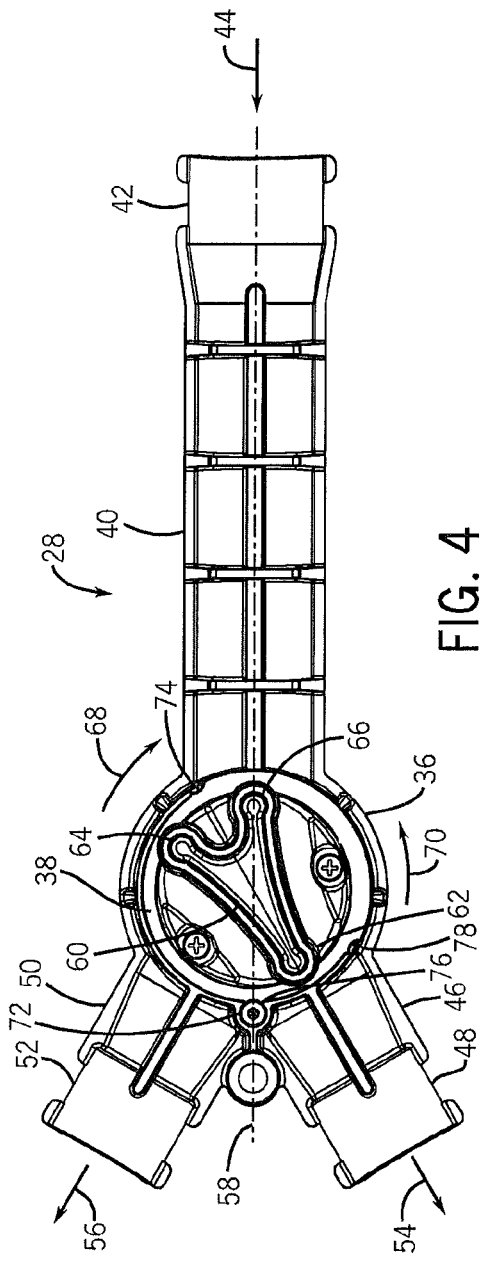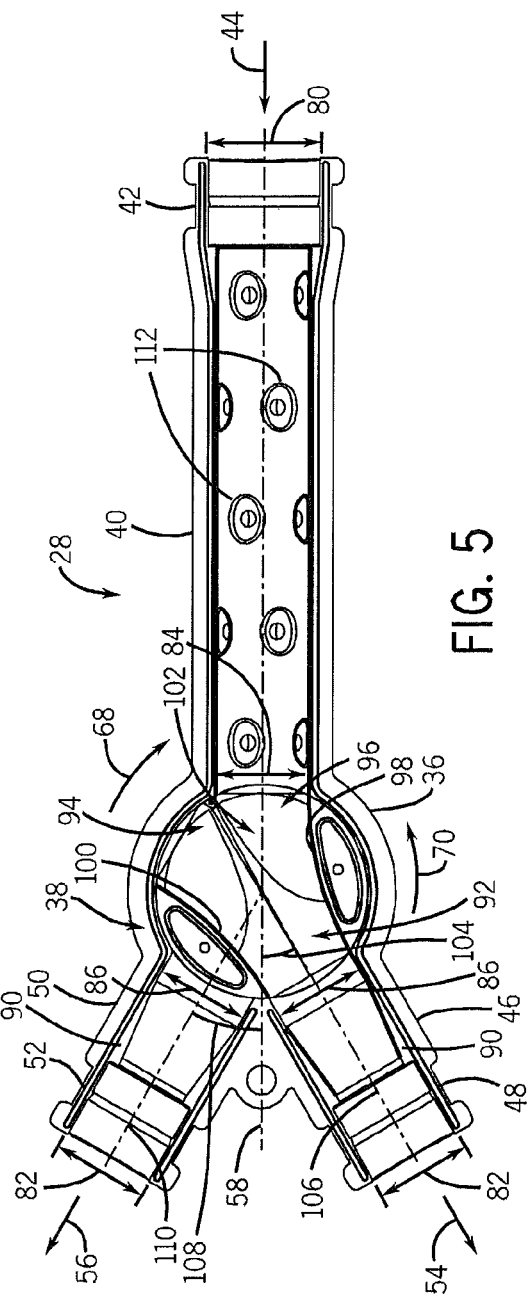

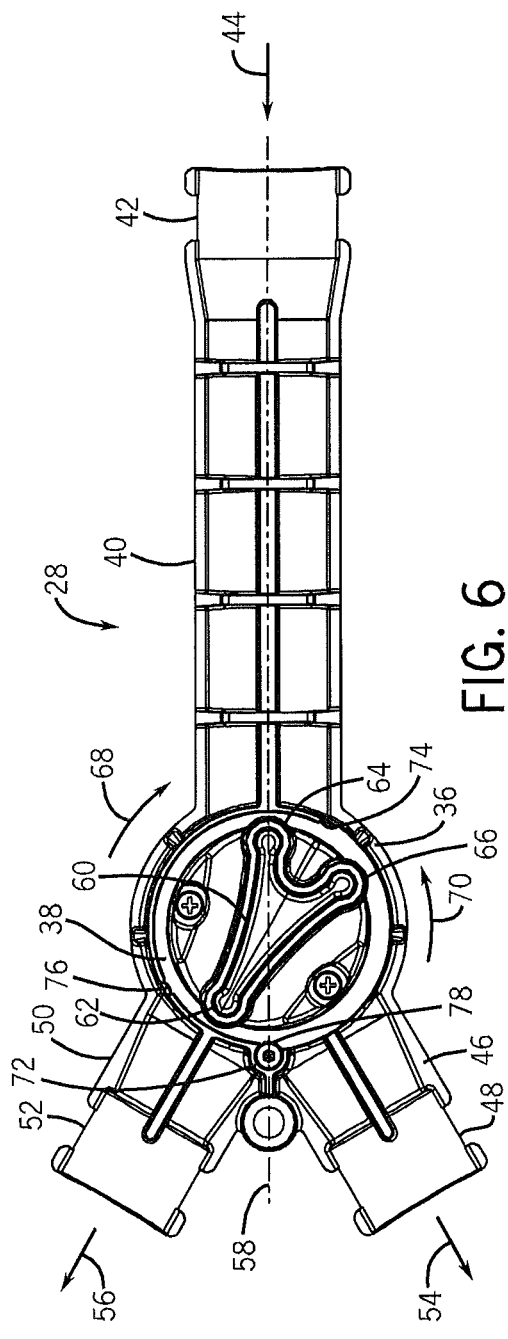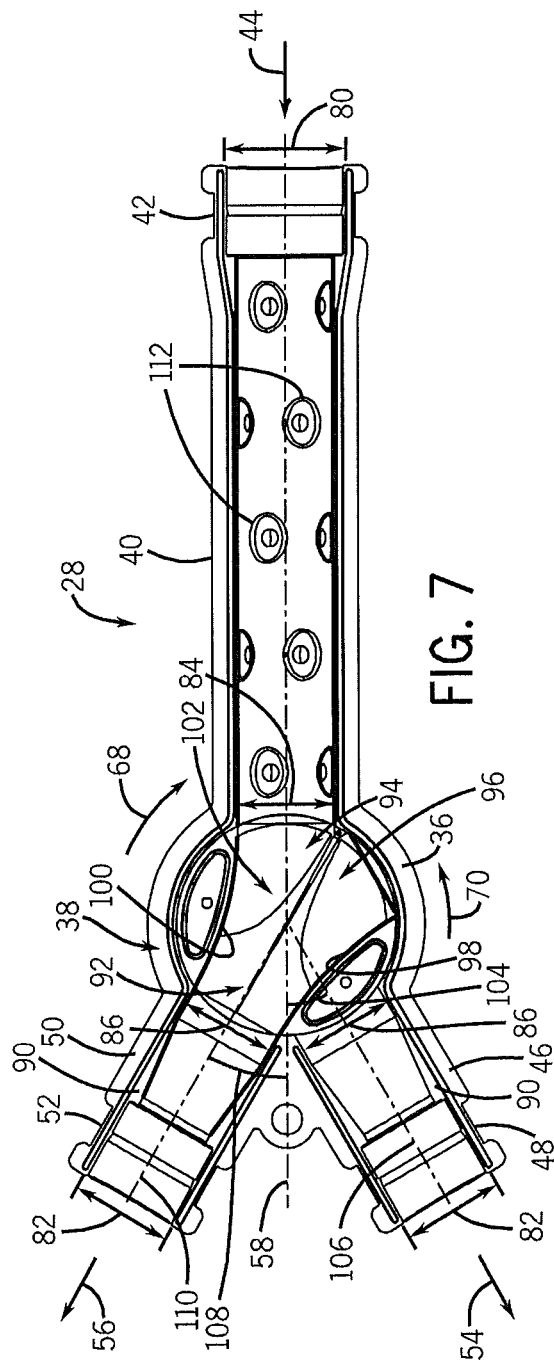

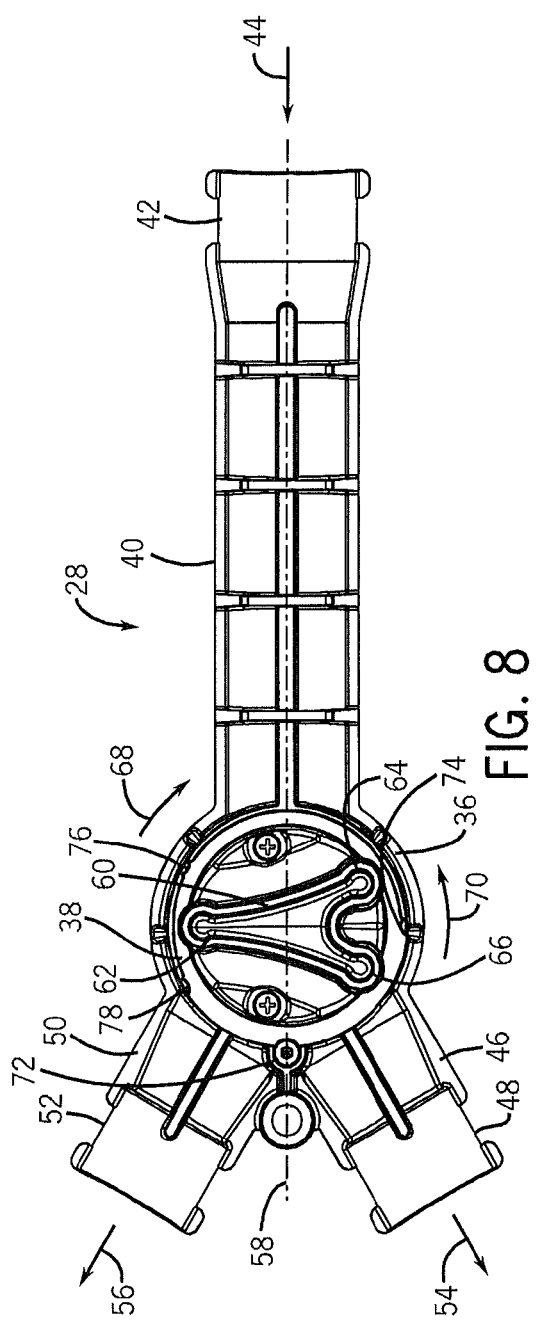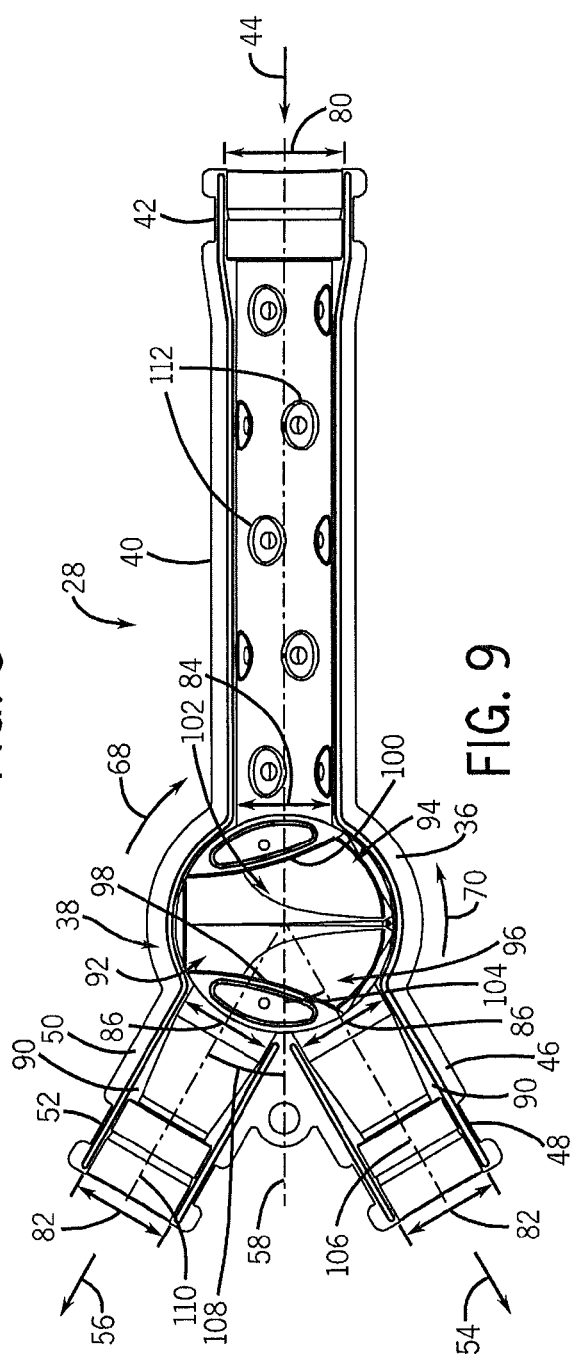

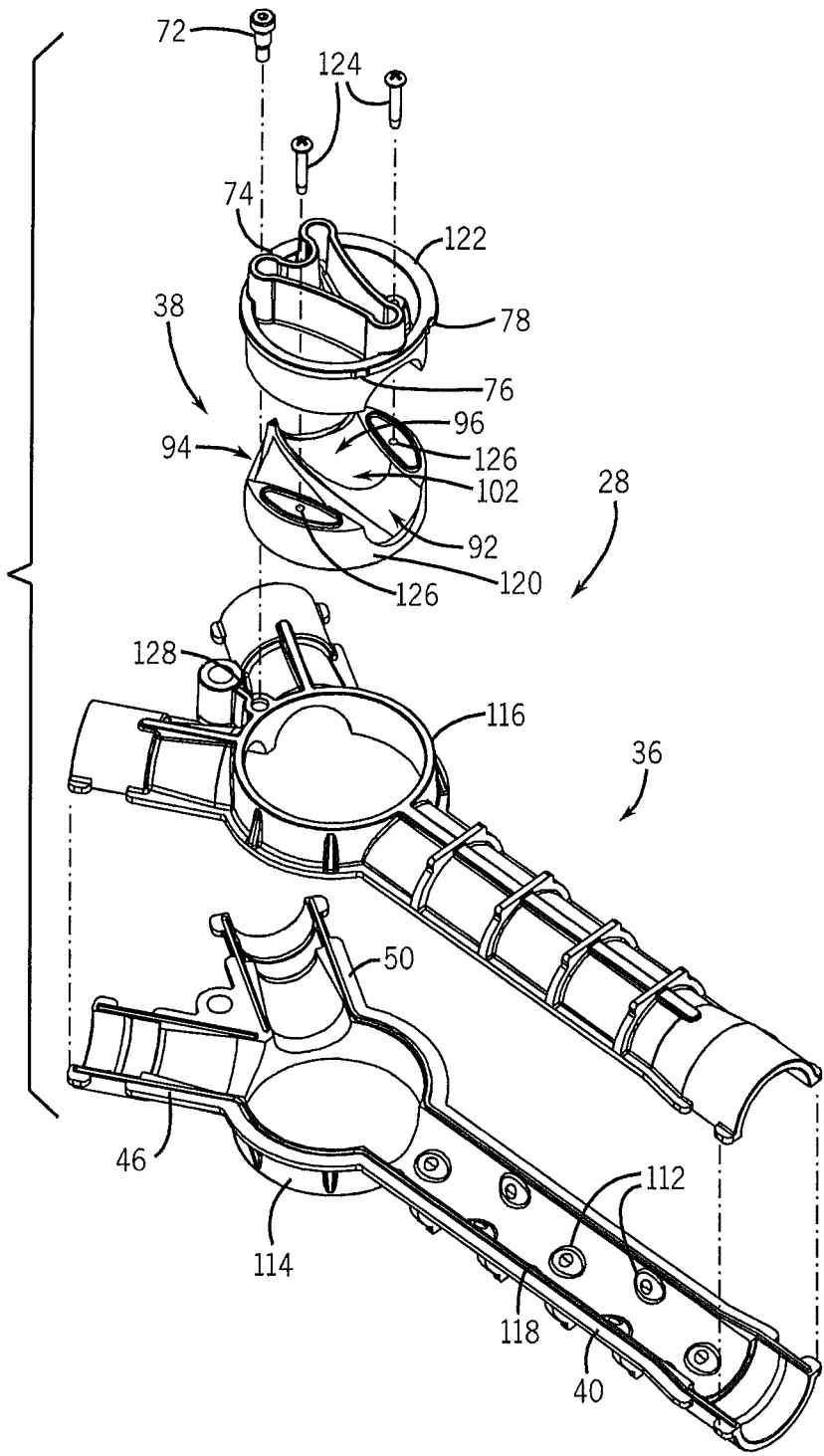

ROTARY FLOW DIVIDER ASSEMBLY FOR AGRICULTURAL PRODUCT DISTRIBUTION SYSTEM

CROSS REFERENCE TO RELATED APPLICATION

This application is the US National Stage filing of International Application Serial No. PCT/IB2012/050158, entitled "ROTARY FLOW DIVIDER ASSEMBLY FOR AGRICULTURAL DISTRIBUTION SYSTEM", filed Jan. 17, 2012, which claims priority from and the benefit of U.S. Provisional Application Ser. No. 61/584,694, entitled "ROTARY VALVE ASSEMBLY FOR AGRICULTURAL PRODUCT DISTRIBUTION SYSTEM", filed Jan. 9, 2012, both of which are hereby incorporated by reference in its entirety.

BACKGROUND

The invention relates generally to ground working equipment, such as agricultural equipment, and more specifically, to a rotary flow divider assembly for an agricultural product distribution system.

Generally, seeding implements are towed behind a tractor or other work vehicle via a hitch assembly secured to a rigid frame of a planter or seeder. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

In certain configurations, a product distribution system is used to meter and deliver product (e.g., seed, fertilizer, etc.) to ground engaging tools within the seeding implement. Certain product distribution systems include a metering system configured to deliver metered quantities of product into an airflow that transfers the product to the openers. For example, primary distribution lines may extend from the metering system to splitters that distribute the product to two secondary distribution lines. Each secondary line may be coupled to a respective ground engaging tool, thereby establishing a flow path from the metering system to the ground engaging tools.

To adjust row spacing, product flow to certain ground engaging tools may be selectively disabled. For example, if the ground engaging tools are spaced 7.5 inches from one another, and 15-inch row spacing is desired, product flow to alternating ground engaging tools may be blocked. In certain configurations, caps may be manually installed on alternating secondary distribution lines to block product flow to respective ground engaging tools. Alternatively, each splitter may include multiple gates configured to selectively block product flow to desired secondary distribution lines. Unfortunately, the process of installing and removing the caps, and/or reconfiguring the gates is time-consuming. Consequently, reconfiguring an implement for a particular row spacing may substantially increase the duration, labor and costs associated with seeding and/or planting operations.

BRIEF DESCRIPTION

In one embodiment, a rotary flow divider assembly includes a housing having an inlet passage configured to receive agricultural product, a first outlet passage configured to discharge the agricultural product, and a second outlet passage configured to discharge the agricultural product. The first and second outlet passages are angled less than 75 degrees relative to a longitudinal axis of the inlet passage. The rotary flow divider assembly also includes a rotary valve disposed within the housing. The rotary valve is selectively rotatable between a first position that facilitates flow of the agricultural product from the inlet passage to the first and second outlet passages, a second position that facilitates flow of the agricultural product from the inlet passage to the first outlet passage, and substantially blocks flow of the agricultural product from the inlet passage to the second outlet passage, and a third position that facilitates flow of the agricultural product from the inlet passage to the second outlet passage, and substantially blocks flow of the agricultural product from the inlet passage to the first outlet passage.

In another embodiment, a rotary flow divider assembly includes a housing having an inlet passage configured to receive agricultural product, and two outlet passages configured to discharge the agricultural product. Each outlet passage is angled less than 60 degrees relative to a longitudinal axis of the inlet passage. The rotary flow divider assembly also includes a rotary valve disposed within the housing. The rotary valve is configured to selectively facilitate flow of the agricultural product from the inlet passage to each outlet passage, to facilitate flow of the agricultural product from the inlet passage to one outlet passage while substantially blocking flow of the agricultural product from the inlet passage to the other outlet passage, and to substantially block flow of the agricultural product from the inlet passage to each outlet passage, via rotation of the rotary valve about an axis substantially perpendicular to the longitudinal axis of the inlet passage.

In a further embodiment, a rotary flow divider assembly includes a housing having an inlet passage configured to receive agricultural product, and two outlet passages configured to discharge the agricultural product. Each outlet passage is angled less than 75 degrees relative to a longitudinal axis of the inlet passage. The rotary flow divider assembly also includes a rotary valve disposed within the housing. The rotary valve is configured to selectively facilitate flow of the agricultural product from the inlet passage to each outlet passage, and to facilitate flow of the agricultural product from the inlet passage to one outlet passage while substantially blocking flow of the agricultural product from the inlet passage to the other outlet passage, via rotation of the rotary valve about an axis substantially parallel to the longitudinal axis of the inlet passage.

DRAWINGS

These and other features, aspects, and advantages of the present invention will become better understood when the following detailed description is read with reference to the accompanying drawings in which like characters represent like parts throughout the drawings, wherein:

FIG. 2 is a top view of an embodiment of a rotary flow divider assembly that may be employed within the product distribution system of FIG. 1;

FIG. 3 is a cutaway view of the rotary flow divider assembly of FIG. 2;

FIG. 4 is a top view of the rotary flow divider assembly of FIG. 2, in which a rotary valve is rotated to a second position;

FIG. 5 is a cutaway view of the rotary flow divider assembly of FIG. 4;

FIG. 6 is a top view of the rotary flow divider assembly of FIG. 2, in which a rotary valve is rotated to a third position;

FIG. 7 is a cutaway view of the rotary flow divider assembly of FIG. 6;

FIG. 8 is a top view of the rotary flow divider assembly of FIG. 2, in which a rotary valve is rotated to a fourth position;

FIG. 9 is a cutaway view of the rotary flow divider assembly of FIG. 8;

FIG. 10 is an exploded view of the rotary flow divider assembly of FIG. 2; and

DETAILED DESCRIPTION

Figure 1:
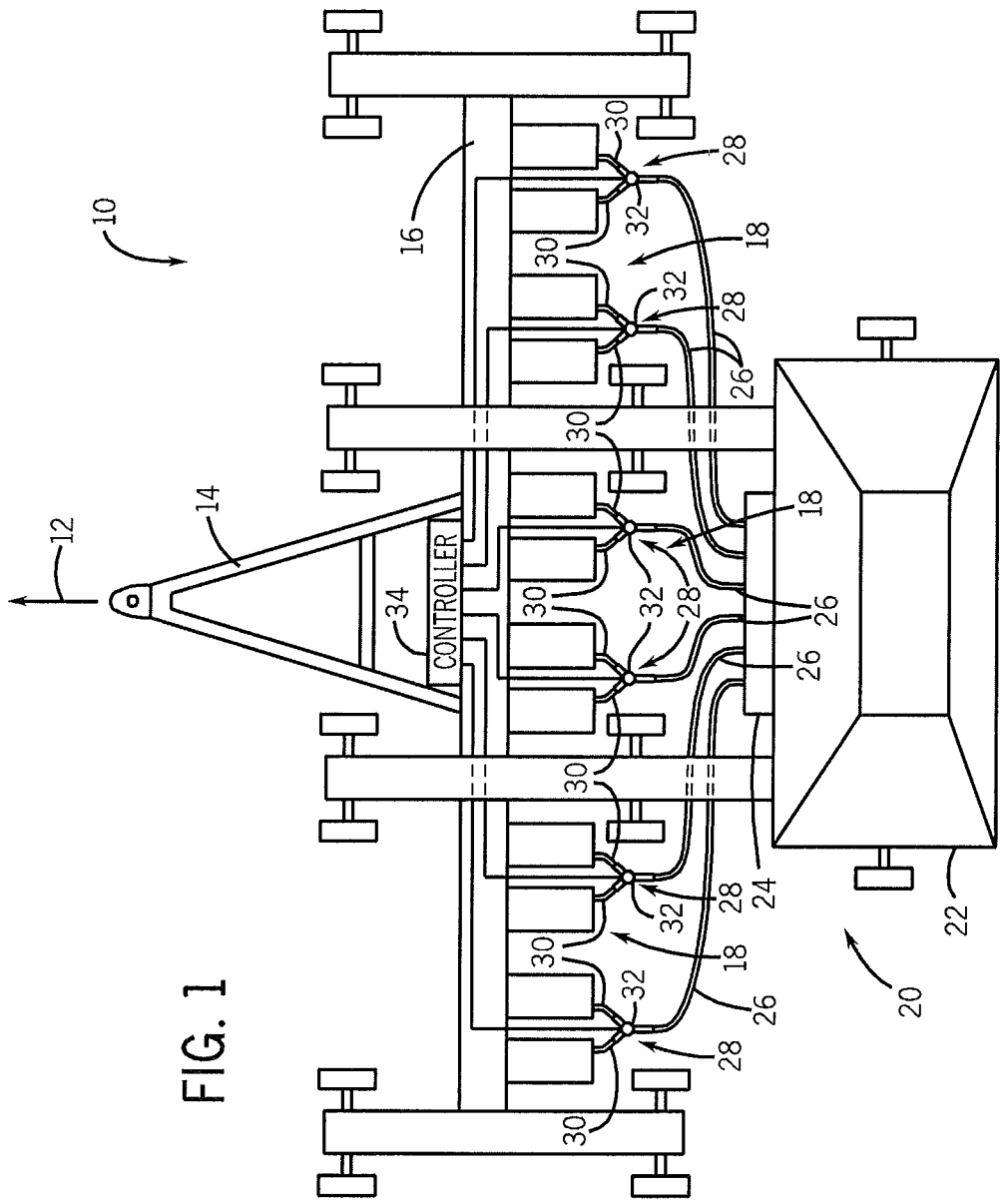
FIG. 1 is a schematic diagram of an agricultural implement that includes an exemplary product distribution system.

FIG. 1 is a schematic diagram of an agricultural implement 10 that includes an exemplary product distribution system. In the illustrated embodiment, the implement 10 is configured to be towed along a direction of travel 12 by a work vehicle, such as a tractor or other prime mover. The work vehicle may be coupled to the implement 10 by a hitch assembly, such as the illustrated A-frame 14. As illustrated, the implement 10 includes a tool bar 16, and ground engaging tools 18 coupled to the tool bar 16. The ground engaging tools 18 are configured to excavate a trench into soil to facilitate seed and/or fertilizer deposition. While the implement 10 includes a single tool bar 16 in the illustrated embodiment, it should be appreciated that alternative embodiments may include additional tool bars 16, each having multiple ground engaging tools 18. Furthermore, while the illustrated implement includes twelve ground engaging tools 18, it should be appreciated that alternative implements may include more or fewer ground engaging tools 18.

In the illustrated embodiment, the implement 10 includes a product distribution system 20 configured to transfer product from a storage tank 22 to each ground engaging tool 18. In certain configurations, the storage tank 22 includes multiple compartments for storing various flowable particulate materials. For example, one compartment may include seeds, and another compartment may include a dry/granular fertilizer. In such configurations, the product distribution system 20 may be configured to deliver both seed and fertilizer to the ground engaging tools 18 via separate distribution lines, or as a mixture of seed and fertilizer through a single set of lines.

During operation, seed and/or fertilizer within the storage tank 22 are gravity fed into a metering system 24, thereby enabling the metering system to distribute a desired quantity of product to the ground engaging tools 18. For example, the metering system 24 may include sectioned meter rollers to regulate the flow of product from the storage tank 22 into an air flow provided by an air source. In such a configuration, the air flow carries the product through distribution lines, thereby supplying the ground engagement tools 18 with seed and/or fertilizer for deposition into the soil. In the illustrated embodiment, the product distribution system 20 includes primary distribution lines 26, rotary flow divider assemblies 28, and secondary distribution lines 30 to facilitate product distribution from the metering system 24 to the ground engaging tools 18. As illustrated, six primary lines 26 extend from the metering system 24 to the rotary flow divider assemblies 28. Each rotary flow divider assembly 28 splits the flow of product into two secondary lines 30, which convey the product to respective ground engaging tools 18. As will be appreciated, the number of primary distribution lines 26 may be particularly selected based on the number of ground engaging tools 18. By way of example, if an implement 10 includes sixty-four ground engaging tools 18, thirty-two primary distribution lines 26 may be employed to convey product to each of the ground engaging tools 18.

In the illustrated embodiment, each rotary flow divider assembly 28 is configured to selectively control product flow to a respective pair of ground engaging tools, thereby enabling an operator to control row spacing. For example, if the ground engaging tools 18 are separated from one another by 7.5 inches, and 15-inch row spacing is desired, each rotary flow divider assembly 28 may block flow to one of the attached ground engaging tools 18. As a result, the product distribution system 20 flows product to alternating ground engaging tools 18, thereby establishing the desired row spacing.

As discussed in detail below, each rotary flow divider assembly 28 includes a housing having an inlet passage configured to receive product from a respective primary distribution line 26, and two outlet passages configured to discharge the product to two respective secondary distribution lines 30. The rotary flow divider assembly 28 also includes a rotary valve disposed within the housing. The rotary valve is configured to selectively facilitate flow of the product from the inlet passage to each outlet passage, and to facilitate flow of the product from the inlet passage to one outlet passage while substantially blocking flow of the product from the inlet passage to the other outlet passage, via rotation of the rotary valve. In the illustrated embodiment, each rotary flow divider assembly 28 includes an actuator 32 (e.g., an electric stepper motor, a hydraulic/pneumatic rotary actuator, a linear actuator, a mechanical actuator, etc.) configured to drive the rotary valve in rotation, thereby controlling product flow to each ground engaging tool. As illustrated, each actuator 32 is communicatively coupled to a controller 34 (e.g., via a CAN bus), thereby enabling the controller 34 to adjust row spacing via actuation of each rotary valve. For example, if the ground engaging tools 18 are spaced 7.5 inches from one another, and 7.5-inch row spacing is desired, the controller 34 may instruct each actuator 32 to rotate the respective rotary valve to a position that facilitates product flow to each ground engaging tool 18. Furthermore, if 15-inch row spacing is desired, the controller 34 may instruct each actuator 32 to rotate the respective rotary valve to a position that facilitates product flow to one ground engaging tool 18 while blocking product flow to the other ground engaging tool 18. In this configuration, an operator may control row spacing from a control panel communicatively coupled to the controller 34, and/or row spacing may be automatically adjusted based on a detected position of the implement (e.g., via a global positioning system receiver).

While the rotary flow divider assemblies 18 are controlled by actuators 32 in the illustrated embodiment, it should be appreciated that each rotary valve may be manually rotated to a desired position in alternative embodiments. Furthermore, it should be appreciated that multiple rotary flow divider assemblies 18 may be linked together (e.g., the input of one rotary flow divider assembly may be coupled to an output of another rotary flow divider assembly) to provide additional control of product flow to the ground engaging tools 18. In addition, certain rotary flow divider assemblies may be configured to block product flow to both secondary distribution lines, thereby disabling each ground engaging tool coupled to the rotary flow divider assembly. Such rotary flow divider assemblies may be employed when wide row spacing (e.g., one active ground engaging tool per three tools, one active ground engaging tool per four tools, etc.) is desired. In addition, the rotary flow divider assemblies may facilitate sectional control of the implement. For instance, product flow to certain ground engaging tools within one or more sections of the implement may be blocked by transitioning respective rotary valves to a position that blocks product flow to the corresponding secondary distribution lines. In this manner, product distribution throughout a field may be precisely controlled. As discussed in detail below, the outlet passages of each rotary flow divider assembly may be angled less than 75 degrees relative to a longitudinal axis of the inlet passage, thereby establishing a substantially smooth flow path through the rotary flow divider assembly. As a result, the possibility of product accumulation within the valve assembly may be substantially reduced, and the efficiency of the product distribution system may be enhanced.

FIG. 2 is a top view of an embodiment of a rotary flow divider assembly 28 that may be employed within the product distribution system 20 of FIG. 1. As illustrated, the rotary flow divider assembly 28 includes a housing 36 and a rotary valve 38 disposed within the housing 36. The housing 36 includes an inlet passage 40 configured to receive product from a respective primary distribution line. In the illustrated embodiment, the inlet passage 40 includes an inlet port 42 configured to connect to the respective primary distribution line, thereby facilitating product flow into the rotary flow divider assembly 28 along a direction 44. As will be appreciated, the inlet port 42 may include seals and/or mounts configured to establish a connection with the primary distribution line that substantially blocks product flow out of the distribution system. In addition, connectors, such as hose clamps and/or cable ties, may be employed to secure the primary distribution line to the inlet port 42.

The housing 36 also includes a first outlet passage 46 configured to discharge product to a secondary distribution line. As illustrated, the first outlet passage 46 includes an outlet port 48 configured to connect the first outlet passage 46 to a respective secondary distribution line, thereby facilitating product flow from the rotary flow divider assembly 28 to a respective ground engaging tool. In addition, the housing 36 includes a second outlet passage 50 configured to discharge product to another secondary distribution line. As illustrated, the outlet passage 50 includes an outlet port 52 configured to connect the second outlet passage 50 to a respective secondary distribution line, thereby facilitating product flow from the rotary flow divider assembly 28 to a respective ground engaging tool. As illustrated, the first outlet passage 46 is configured to discharge the product in a direction 54, and the second outlet passage 50 is configured to discharge the product in a direction 56. Similar to the inlet port 42, each outlet port 48 and 52 may include seals and/or mounts configured to establish a connection with a respective secondary distribution line that substantially blocks product flow out of the distribution system. In addition, connectors, such as hose clamps and/or cable ties, may be employed to secure each outlet port 48 and 52 to the respective secondary distribution line.

In the illustrated embodiment, the rotary valve 38 is configured to rotate about an axis substantially perpendicular to a longitudinal axis 58 to the inlet passage 40. Specifically, the rotary valve 38 is selectively rotatable between a first position that facilitates product flow from the inlet passage 40 to the first and second outlet passages 46 and 50, a second position that facilitates product flow from the inlet passage 40 to the first outlet passage 46, and substantially blocks product flow from the inlet passage 40 to the second outlet passage 50, and a third position that facilitates product flow from the inlet passage 40 to the second outlet passage 50, and substantially blocks product flow from the inlet passage 40 to the first outlet passage 46. In certain embodiments, the rotary valve 38 is also rotatable to a fourth position that substantially blocks product flow from the inlet passage 40 to the first and second outlet passages 46 and 50. In this configuration, product flow to each ground engaging tool may be selectively controlled via rotation of the rotary valve 38 to a desired position.

In the illustrated embodiment, the rotary valve 38 includes a handle 60 having multiple protrusions configured to provide a visual indication of valve position. As illustrated, the handle 60 is substantially triangular shaped, and includes a first protrusion 62, a second protrusion 64, and a third protrusion 66. With the valve oriented in the illustrated first position, the first protrusion 62 is aligned with the inlet passage 40, the second protrusion 64 is aligned with the first outlet passage 46, and the third protrusion 66 is aligned with the second outlet passage 50. Accordingly, with the valve in the illustrated first position, the protrusions provide a visual indication that a flow path is established between the inlet passage 40 and both outlet passages 46 and 50.

As discussed in detail below, an operator may transition the rotary valve 38 to the second position by rotating the handle 60 in a clockwise direction 68 until the first protrusion 62 is aligned with the first outlet passage 46. With the rotary valve 38 in the second position, product flows to the first outlet passage 46 alone. In addition, an operator may transition the rotary valve 38 to the third position by rotating the handle 60 in a counterclockwise direction 70 until the first protrusion 62 is aligned with the second outlet passage 50. With the rotary valve 38 in the third position, product flows to the second outlet passage 50 alone. Consequently, the handle 60 provides a visual indication of the product flow path through the rotary flow divider assembly 28 via placement of the protrusions relative to the inlet/outlet passages.

In the illustrated embodiment, the rotary flow divider assembly 28 includes a fastener 72 configured to secure the rotary valve 38 to the housing 36. The fastener 72 is also configured to block rotation of the rotary valve 38 while the fastener 72 is engaged with one of a series of notches disposed about a circumference of the rotary valve 38. As illustrated, with the rotary valve 38 in the illustrated first position, the fastener 72 is engaged with a first notch 74, thereby holding the rotary valve 38 in the first position. To transition the rotary valve 38 to the second position, the rotary valve 38 may be rotated in the clockwise direction 68 to disengage the notch from the fastener. Rotation may continue until the first protrusion 62 aligns with the first outlet passage 46. Once aligned, a second notch 76 engages the fastener 72, thereby holding the rotary valve 38 in the second position. In addition, to transition the rotary valve 38 from the first position to the third position, the rotary valve 38 may be rotated in the counterclockwise direction 70 to disengage the notch from the fastener. Rotation may continue until the first protrusion 62 aligns with the second outlet passage 50. Once aligned, a third notch 78 engages the fastener 72, thereby holding the rotary valve 38 in the third position. In certain embodiments, the rotary valve 38 may include a fourth notch configured to hold the rotary valve in the fourth position that blocks product flow to both outlet passages 46 and 50.

FIG. 3 is a cutaway view of the rotary flow divider assembly 28 of FIG. 2. As illustrated, an inner diameter 80 of the inlet port 42 is selected to accommodate an outer diameter of the primary distribution line, and an inner diameter 82 of the outlet ports 48 and 52 is selected to accommodate an outer diameter of the secondary distribution lines. For example, in certain embodiments, the primary distribution line may have an outer diameter of about 1.5 inches, and the secondary distribution lines may have an outer diameter of about 1.25 inches. However, it should be appreciated that alternative embodiments may include primary and/or secondary distribution lines having larger or smaller outer diameters.

In the illustrated embodiment, the inlet passage 40 is configured to transition between the inner diameter 80 of the inlet port 42, and an inner diameter 84 configured to interface with the rotary valve 38. By way of example, if the outer diameter of the primary distribution line is about 1.5 inches, and the inner diameter of the primary distribution line is about 1.25 inches, the inlet passage 40 may transition between an inner diameter 80 of about 1.5 inches at the inlet port 42 to an inner diameter 84 of about 1.25 inches at the inlet passage 40, thereby accommodating the primary distribution line, and providing a substantially smooth transition from the primary distribution line to the inlet passage 40. Similarly, the first and second outlet passages 46 and 50 are configured to transition between the inner diameter 82 of the respective outlet ports 48 and 52, and an inner diameter 86 configured to interface with the rotary valve 38. By way of example, if the outer diameter of each secondary distribution line is about 1.25 inches, and the inner diameter of each secondary distribution line is about 1.0 inches, each outlet passage 46 and 50 may transition between an inner diameter 82 of about 1.25 inches at the respective outlet port 48 and 52 to an inner diameter of about 1.0 inches. In addition, the outlet passages 46 and 50 include angled portions 90 configured to increase the inner diameter of each passage from about 1.0 inches at the respective outlet ports to about 1.25 inches at the rotary valve 38. Accordingly, the inner diameter 84 of the inlet passage 40 at the rotary valve 38 is substantially equal to the inner diameter 86 of the outlet passages 46 and 50 at the rotary valve 38. Consequently, each port of the rotary valve 38 may properly align with each passage of the housing 36 because the diameter of each port is substantially equal to the inner diameter of each passage. As a result, substantially smooth flow transitions through the rotary flow divider assembly 28 are established. It should be appreciated that alternative embodiments may include primary and/or secondary distribution lines having larger or smaller inner and/or outer diameters. In such embodiments, the passages of the housing 36 may be configured to accommodate the diameter of each distribution line.

As illustrated, the rotary valve 38 includes a first port 92, a second port 94, and a third port 96. With the rotary valve 38 in the illustrated first position, the first port 92 is aligned with the inlet passage 40, the second port 94 is aligned with the first outlet passage 46, and the third port 96 is aligned with the second outlet passage 50. Accordingly, product flowing into the rotary valve 38 from the inlet passage 40 is substantially evenly split into a first stream that flows into the first outlet passage 46, and a second stream that flows into the second outlet passage 50. As a result, with the rotary valve in the first position, about 50 percent of the product entering the rotary flow divider assembly 28 is directed toward a first ground engaging tool, and about 50 percent of the product is directed toward a second ground engaging tool.

As illustrated, the rotary valve 38 includes a first boundary 98 and a second boundary 100 configured to direct the product from the inlet passage 40 to the outlet passages 46 and 50. In the illustrated embodiment, the boundaries 98 and 100 are particularly contoured to established a substantially smooth flow path through the rotary valve 38. In addition, a body 102 of the rotary valve 38 is contoured to establish a substantially smooth flow path from the first port 92 to the second and third ports 94 and 96. The smooth flow path provided by the boundaries 98 and 100, and the body 102 substantially reduces pressure loss through the rotary flow divider assembly 28, thereby increasing the efficiency of the product distribution system. In addition, the smooth flow path substantially reduces the possibility of product accumulation within the rotary flow divider assembly 28, which may otherwise interfere with product flow to the respective ground engaging tools.

In addition, the first and second outlet passage 46 and 50 are particularly oriented relative to the longitudinal axis 58 to establish an efficient flow path through the rotary flow divider assembly 28. As illustrated, the first outlet passage 46 is oriented at a first angle 104 between the longitudinal axis 58 of the inlet passage 40 and an axis 106 extending along the first outlet passage 46. Similarly, the second outlet passage 50 is oriented at a second angle 108 between the longitudinal axis 58 of the inlet passage 40 and an axis 110 extending along the second outlet passage 50. In the illustrated embodiment, the first and second angles 104 and 108 are about 30 degrees. However, it should be appreciated that alternative embodiments may include angles 104 and 108 less than 75 degrees, less than 60 degrees, less than 45 degrees, less than 35 degrees, less than 30 degrees, or less than 25 degrees. The shallow angles substantially reduce variations in flow direction, thereby further reducing pressure loss, and increasing the efficiency of the product distribution system.

In the illustrated embodiment, the rotary flow divider assembly 28 includes multiple protrusions 112 distributed about an interior surface of the inlet passage 40. The protrusions 112 are configured to enhance the homogeneity of product distribution within the air flow. As a result, the rotary valve 38 may substantially equally distribute the product between the two outlet passages 46 and 50, thereby providing substantially even product flow to each ground engaging tool. As will be appreciated, the number of protrusions, the size of each protrusion, the position of each protrusion, and the configuration of each protrusion may be particularly selected to establish a desired turbulent flow that increases product distribution homogeneity. Because the illustrated protrusions are substantially smooth, the possibility of product accumulation within the inlet passage 40 is substantially less than configurations that employ ribs which may collect product between the ribs. Without accumulated product, the efficient flow path through the rotary flow divider assembly 28 may be maintained, thereby establishing an efficient product distribution system.

FIG. 4 is a top view of the rotary flow divider assembly 28 of FIG. 2, in which the rotary valve 38 is rotated to a second position. With the rotary valve 38 oriented in the illustrated second position, the rotary flow divider assembly 28 facilitates product flow to the first outlet passage 46, and blocks product flow to the second outlet passage 50. Accordingly, product flows from the inlet passage 40 to the first outlet passage 46 alone, thereby providing product to a respect ground engaging tool. As illustrated, the first protrusion 62 of the handle 60 is aligned with the first outlet passage 46, and the third protrusion 66 is aligned with the inlet passage 40. No protrusion is aligned with the second outlet passage 50. Accordingly, the handle 60 provides a visual indication that a flow path is established between the inlet passage 40 and the first outlet passage 46, and that product flow is blocked to the second outlet passage 50.

FIG. 5 is a cutaway view of the rotary flow divider assembly 28 of FIG. 4. With the rotary valve 38 in the illustrated second position, the first port 92 is aligned with the first outlet passage 46, and the third port 96 is aligned with the inlet passage 40. The second outlet passage 50 is substantially blocked by the second boundary 100. Accordingly, product flowing into the rotary valve 38 from the inlet passage 40 is directed into the first outlet passage 46 alone. As a result, with the rotary valve 38 in the second position, substantially all of the product entering the rotary flow divider assembly 28 flows to a ground engaging tool coupled to the first outlet passage 46. Furthermore, the body 102 of the rotary valve 38 is contoured to establish a substantially smooth flow path from the third port 96 to the first port 92. The smooth flow path substantially reduces pressure loss through the rotary flow divider assembly 28, thereby increasing the efficiency of the product distribution system. In addition, the smooth flow path substantially reduces product accumulation within the rotary flow divider assembly 28, which may otherwise interfere with product flow to the respective ground engaging tools.

FIG. 6 is a top view of the rotary flow divider assembly 28 of FIG. 2, in which the rotary valve 38 is rotated to a third position. With the rotary valve 38 oriented in the illustrated third position, the rotary flow divider assembly 28 facilitates product flow to the second outlet passage 50, and blocks product flow to the first outlet passage 46. Accordingly, product flows from the inlet passage 40 to the second outlet passage 50 alone, thereby providing product to a respect ground engaging tool. As illustrated, the first protrusion 62 of the handle 60 is aligned with the second outlet passage 50, and the second protrusion 64 is aligned with the inlet passage 40. No protrusion is aligned with the first outlet passage 46. Accordingly, the handle 60 provides a visual indication that a flow path is established between the inlet passage 40 and the second outlet passage 50, and that product flow is blocked to the first outlet passage 46.

FIG. 7 is a cutaway view of the rotary flow divider assembly 28 of FIG. 6. With the rotary valve 38 in the illustrated third position, the first port 92 is aligned with the second outlet passage 50, and the second port 94 is aligned with the inlet passage 40. The first outlet passage 46 is substantially blocked by the first boundary 98. Accordingly, product flowing into the rotary valve 38 from the inlet passage 40 is directed into the second outlet passage 50 alone. As a result, with the rotary valve 38 in the third position, substantially all of the product entering the rotary flow divider assembly 28 flows to a ground engaging tool coupled to the second outlet passage 50. Furthermore, the body 102 of the rotary valve 38 is contoured to establish a substantially smooth flow path from the second port 94 to the first port 92. The smooth flow path substantially reduces pressure loss through the rotary flow divider assembly 28, thereby increasing the efficiency of the product distribution system. In addition, the smooth flow path substantially reduces product accumulation within the rotary flow divider assembly 28, which may otherwise interfere with product flow to the respective ground engaging tools.

FIG. 8 is a top view of the rotary flow divider assembly 28 of FIG. 2, in which the rotary valve 38 is rotated to a fourth position. With the rotary valve 38 oriented in the illustrated fourth position, the rotary flow divider assembly 28 blocks product flow to the first and second outlet passages 46 and 50. Accordingly, product flow is blocked to each ground engaging tool. As illustrated, the first protrusion 62, the second protrusion 64, and the third protrusion 66 are not aligned with the inlet passage 40 or the outlet passages 46 and 50. Accordingly, the handle 60 provides a visual indication that product flow is blocked to the first and second outlet passages 46 and 50.

FIG. 9 is a cutaway view of the rotary flow divider assembly 28 of FIG. 8. With the rotary valve 38 in the illustrated fourth position, the inlet passage 40 is substantially blocked by the second boundary 100. Accordingly, product flow to each outlet passage 46 and 50 is substantially blocked. As a result, with the rotary valve 38 in the fourth position, substantially no product flows to the ground engaging tools coupled to the rotary flow divider assembly 28.

FIG. 10 is an exploded view of the rotary flow divider assembly 28 of FIG. 2. In the illustrated embodiment, the rotary flow divider assembly 28 includes a first housing section 114 and a second housing section 116. The housing sections 114 and 116 are configured to couple to one another to form the housing 36. For example, each housing section may be formed by an injection molding process, and the sections may be coupled to one another via an adhesive connection and/or fasteners to form the housing 36. In the illustrated embodiment, the first housing section 114 includes a recess 118 configured to interface with a corresponding ridge in the second housing section 116. The recess 118 and the ridge are configured to facilitate alignment of the first housing section 114 with the second housing section 116 during construction of the housing 36. In certain embodiments, the first housing section 114 and the second housing section 116 may have substantially the same shape (e.g., substantially the same ridge/recess arrangement). In such embodiments, the ridges and recesses may be arranged to interface with one another when the first and second housing sections are aligned in a facing relation.

Similar to the housing 36, the rotary valve 38 includes a first body section 120 and a second body section 122. The body sections 120 and 122 are configured to couple to one another to form the rotary valve 38. For example, each housing section may be formed by an injection molding process, and the sections may be coupled to one another by fasteners 124. In the illustrated embodiment, the first body section 120 includes receptacles 126 configured to receive the fasteners 124, thereby enabling the body sections 120 and 122 to be secured to one another. Once the rotary valve 38 and the housing 36 are assembled, the fastener 72 may be disposed within a receptacle 128, thereby securing the rotary valve 38 to the housing 36, and enabling one of the series of notches to engage the fastener 72 to hold the rotary valve 38 in a desired position. While the illustrated rotary valve 38 is formed from two body sections 120 and 122, it should be appreciated that alternative embodiments may employ a single-piece valve (e.g., formed by an injection molding process).

Figure 11:
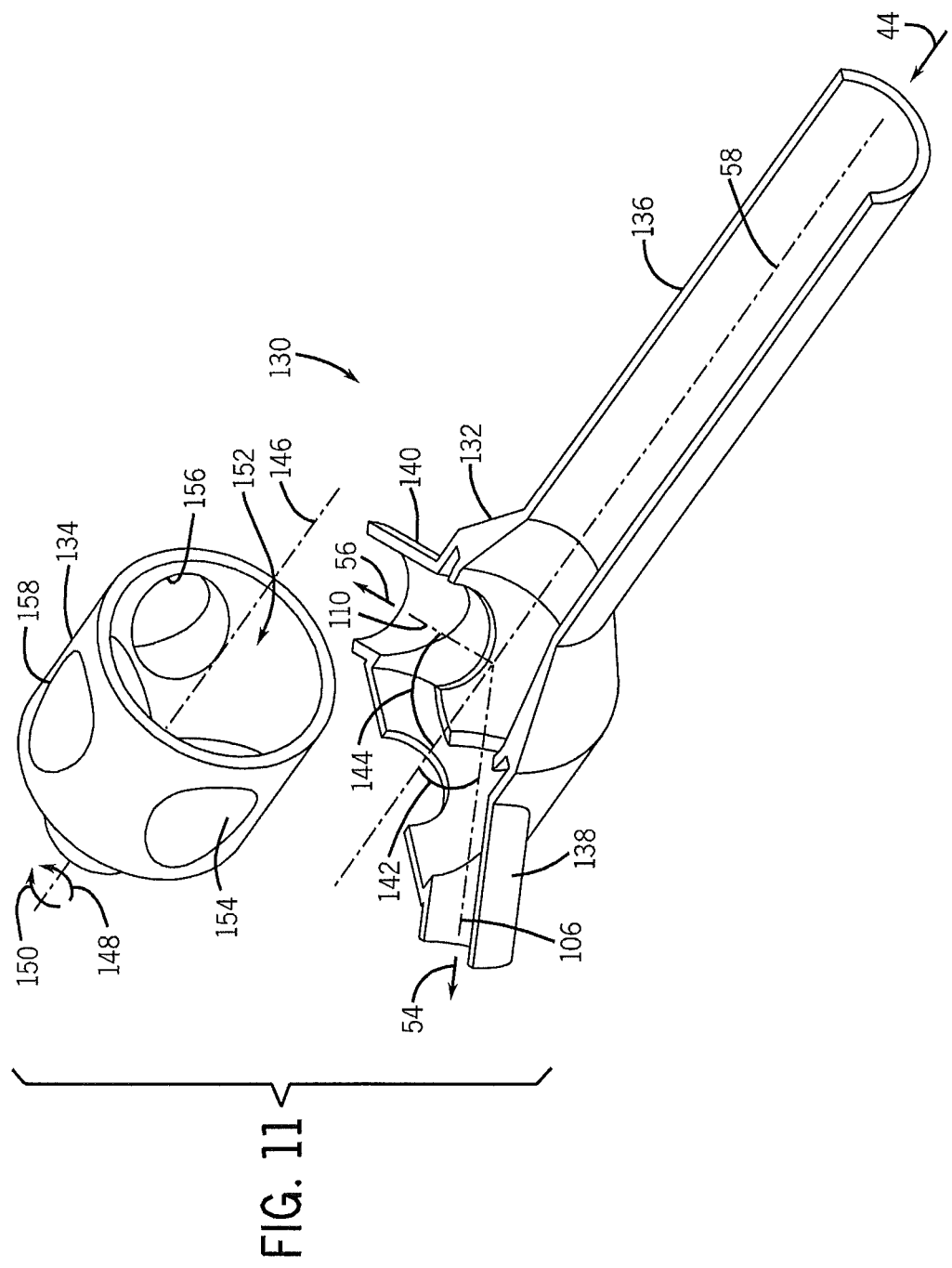
FIG. 11 is an exploded view of an alternative embodiment of a rotary flow divider assembly that may be employed within the product distribution system of FIG. 1.

FIG. 11 is an exploded view of an alternative embodiment of a rotary flow divider assembly 130 that may be employed within the product distribution system of FIG. 1. As illustrated, the rotary flow divider assembly 130 includes a housing 132 and a rotary valve 134 disposed within the housing 132. While only a first section of the housing 132 is shown for clarity, it should be appreciated that the housing 132 includes a second section configured to engage with the first section to form the housing structure. Similar to the rotary flow divider assembly 28 described above with reference to FIGS. 2-10, the housing 132 includes an inlet passage 136, a first outlet passage 138, and a second outlet passage 140. While the interior surface of the illustrated inlet passage 136 is substantially smooth, it should be appreciated that alternative embodiments may include protrusions, such as the protrusions 112 described above with reference to FIG. 3. In the illustrated embodiment, the inlet passage 136 is configured to receive product from the primary distribution line, and the outlet passages 138 and 140 are configured to discharge product to the secondary distribution lines.

Similar to the embodiment described above with reference to FIGS. 2-10, the first and second outlet passage 138 and 140 are particularly oriented relative to the longitudinal axis 58 to establish an efficient flow path through the rotary flow divider assembly 130. As illustrated, the first outlet passage 138 is oriented at a first angle 142 between the longitudinal axis 58 of the inlet passage 136 and the axis 106 of the first outlet passage 138. Similarly, the second outlet passage 140 is oriented at a second angle 144 between the longitudinal axis 58 of the inlet passage 136 and the axis 110 of the second outlet passage 140. In the illustrated embodiment, the first and second angles 142 and 144 are about 45 degrees. However, it should be appreciated that alternative embodiments may include angles 142 and 144 less than 75 degrees, less than 60 degrees, less than 45 degrees, less than 35 degrees, less than 30 degrees, or less than 25 degrees. The shallow angles substantially reduce variations in flow direction, thereby reducing pressure loss, and increasing the efficiency of the product distribution system.

In the illustrated embodiment, the rotary valve 134 is configured to rotate about an axis 146 substantially parallel to the longitudinal axis 58 of the inlet passage 136. For example, the rotary valve 134 may rotate in a first direction 148 and/or a second direction 150 to selectively align passages within the rotary valve 134 with the first and second outlet passages 138 and 140. As illustrated, the rotary valve 134 includes three passages extending between an interior volume 152 and an exterior circumferential surface of the rotary valve 134. The passages are configured to selectively flow product from the inlet passage 136 to each respective outlet passage 138 and 140. For example, with the rotary valve 134 in the illustrated position, product flowing through the inlet passage 136 and into the interior volume 152 is directed to a first passage 154 aligned with the first outlet passage 138, and to a second passage 156 aligned with the second outlet passage 140. Accordingly, the product flow is split between the two outlet passage 138 and 140, thereby providing product to each respective ground engaging tool.

If the rotary valve 134 is rotated about 90 degrees in the first direction 148, a third passage 158 is aligned with the first outlet passage 138, and the second outlet passage 140 is blocked by a wall of the rotary valve 134. Accordingly, product flows through the first outlet passage 138 alone, thereby providing product to a respective ground engaging tool. Conversely, if the rotary valve 134 is rotated about 90 degrees in the second direction 150, the third passage 158 is aligned with the second outlet passage 140, and the first outlet passage 138 is blocked by the wall of the rotary valve 134. Accordingly, product flows through the second outlet passage 140 alone, thereby providing product to a respective ground engaging tool. As will be appreciated, the contours of the interior volume 152 and/or the passages 154, 156 and 158 may be particularly configured to reduce pressure loss through the rotary flow divider assembly 130, thereby increasing the efficiency of the distribution system. In addition, while a three-position rotary valve is employed within the illustrated embodiment, it should be appreciated that alternative embodiments may include a four-position rotary valve configured to selectively block product flow to each outlet passage 138 and 140. Furthermore, it should be appreciated that the rotary valve 134 may be manually rotated via a handle (e.g., having protrusions configured to provide a visual indication of valve position), or driven to rotate by an actuator, such as an electric stepper motor, a hydraulic/pneumatic rotary actuator, a linear actuator (e.g., electromechanical, hydraulic, pneumatic, etc.), or a mechanical actuator (e.g., cable, chain, lever, etc.).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A rotary flow divider assembly, comprising:
a housing having an inlet passage configured to receive an agricultural product, a first outlet passage configured to discharge the agricultural product, and a second outlet passage configured to discharge the agricultural product, wherein the first and second outlet passages are angled less than 75 degrees relative to a longitudinal axis of the inlet passage; and
a rotary valve disposed within the housing, wherein the rotary valve comprises a first port, a second port, a third port, a first boundary, and a second boundary;
wherein the rotary valve is selectively rotatable between a first position that aligns the first port with the inlet passage, the second port with the first outlet passage, and the third port with the second outlet passage to facilitate flow of the agricultural product from the inlet passage to the first and second outlet passages, a second position that aligns the first port with the first outlet passage, the third port with the inlet passage, and the second boundary with the second outlet passage to facilitate flow of the agricultural product from the inlet passage to the first outlet passage and to substantially block flow of the agricultural product from the inlet passage to the second outlet passage, and a third position that aligns the first port with the second outlet passage, the second port with the inlet passage, and the first boundary with the first outlet passage to facilitate flow of the agricultural product from the inlet passage to the second outlet passage and to substantially block flow of the agricultural product from the inlet passage to the first outlet passage;
wherein the first boundary, the second boundary, and a body of the rotary valve are contoured to establish a substantially smooth flow path from the inlet passage to the first outlet passage, to the second outlet passage, or a combination thereof; and
wherein an inner surface of the first boundary and an inner surface of the second boundary form respective portions of the substantially smooth flow path, the inner surface of the first boundary forms a continuous curve between the first port and the third port, and the inner surface of the second boundary forms a continuous curve between the first port and the second port.

2. The rotary flow divider assembly of claim 1, wherein the rotary valve is rotatable to a fourth position that substantially blocks flow of the agricultural product from the inlet passage to the first and second outlet passages.

3. The rotary flow divider assembly of claim 1, wherein the rotary valve is configured to rotate about an axis substantially perpendicular to the longitudinal axis of the inlet passage.

4. The rotary flow divider assembly of claim 3, wherein the rotary valve comprises a handle having a plurality of protrusions configured to provide a visual indication of valve position.

5. The rotary flow divider assembly of claim 3, comprising a fastener configured to block rotation of the rotary valve while the fastener is engaged with one of a plurality of notches disposed about a circumference of the rotary valve.

6. The rotary flow divider assembly of claim 1, comprising an actuator configured to selectively rotate the rotary valve between the first, second, and third positions.

7. The rotary flow divider assembly of claim 1, comprising a plurality of protrusions distributed about an interior surface of the inlet passage, wherein protrusions of the plurality of protrusions are configured to enhance homogeneity of a distribution of the agricultural product within an air flow.

8. The rotary flow divider assembly of claim 1, comprising a first housing section and a second housing section, wherein the first and second housing sections are configured to couple to one another to form the housing.

9. The rotary flow divider assembly of claim 1, wherein an inner diameter of the inlet passage at the rotary valve, an inner diameter of the first outlet passage at the rotary valve, an inner diameter of the second outlet passage at the rotary valve, a diameter of the first port, a diameter of the second port, and a diameter of the third port are substantially equal to one another.

10. A rotary flow divider assembly, comprising:
a housing having an inlet passage configured to receive an agricultural product, a first outlet passage configured to discharge the agricultural product, and a second outlet passage configured to discharge the agricultural product, wherein the first and second outlet passages are angled less than 75 degrees relative to a longitudinal axis of the inlet passage;
a rotary valve disposed within the housing, wherein the rotary valve comprises a first port, a second port, a third port, a first boundary, and a second boundary, the rotary valve is configured to rotate about an axis substantially perpendicular to the longitudinal axis of the inlet passage, the rotary valve comprises a first notch, a second notch, and a third notch, and the first, second, and third notches extend from a body of the rotary valve and are separated from one another along a circumference of the rotary valve; and
a fastener configured to couple to the housing;
wherein the rotary valve is selectively rotatable between a first position that aligns the first port with the inlet passage, the second port with the first outlet passage, and the third port with the second outlet passage to facilitate flow of the agricultural product from the inlet passage to the first and second outlet passages, a second position that aligns the first port with the first outlet passage, the third port with the inlet passage, and the second boundary with the second outlet passage to facilitate flow of the agricultural product from the inlet passage to the first outlet passage and to substantially block flow of the agricultural product from the inlet passage to the second outlet passage, and a third position that aligns the first port with the second outlet passage, the second port with the inlet passage, and the first boundary with the first outlet passage to facilitate flow of the agricultural product from the inlet passage to the second outlet passage and to substantially block flow of the agricultural product from the inlet passage to the first outlet passage;
wherein the first notch is positioned to engage the fastener while the rotary valve is in the first position, the second notch is positioned to engage the fastener while the rotary valve is in the second position, and the third notch is positioned to engage the fastener while the rotary valve is in the third position; and
wherein the first notch is configured to hold the rotary valve in the first position while engaged with the fastener, the second notch is configured to hold the rotary valve in the second position while engaged with the fastener, and the third notch is configured to hold the rotary valve in the third position while engaged with the fastener.

11. The rotary flow divider assembly of claim 10, wherein the rotary valve is rotatable to a fourth position that substantially blocks flow of the agricultural product from the inlet passage to the first and second outlet passages.

12. The rotary flow divider assembly of claim 10, wherein the rotary valve comprises a handle having a plurality of protrusions configured to provide a visual indication of valve position.

13. The rotary flow divider assembly of claim 10, wherein the rotary valve is contoured to establish a substantially smooth flow path from the inlet passage to the first outlet passage, to the second outlet passage, or a combination thereof.

14. The rotary flow divider assembly of claim 10, comprising a first housing section and a second housing section, wherein the first and second housing sections are configured to couple to one another to form the housing.

* * * * *